Figure 1:
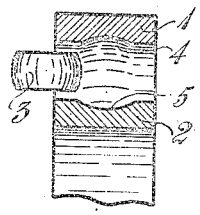

E. H. W. WEIBULL.
BALL BEARING.
APPLICATION FILED SEPT. 17, 1918.

1,301,527.

Patented Apr. 22, 1919.

Inventor
E. H. W. Weibull
By H. R. Kerslake
Atty.

UNITED STATES PATENT OFFICE.

ERNST HJALMAR WALODDI WEIBULL, OF GOTTENBORG, SWEDEN.

BALL-BEARING.

1,301,527.   Specification of Letters Patent.   Patented Apr. 22, 1919.

Application filed September 17, 1918. Serial No. 254,490.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented new and useful Improvements in Ball-Bearings, of which the following is a specification.

This invention relates to improvements in bearings of the type having inner and outer raceways with rollers therebetween. The invention is directed more particularly to improvements in the type of bearings, in which the inner and outer raceways are provided with oppositely disposed grooves curved in cross section, and the rollers are provided with peripheries curved transversely to conform to the curvature of the grooves. In this type of bearing as heretofore manufactured, the curvature of the peripheries of the rollers are arcs of circles having their centers in the center of the rollers and the curvatures of the grooves are arcs of circles, which are concentric with the curves of the roller peripheries. With this type of bearing, in order that the rollers may be inserted between the rings, without perforating the rings, it is necessary to provide the opposite sides of the rollers with flattened surfaces, so that the rollers may be inserted between the rings and then turned to bring their curved peripheries into engagement with the curved grooves of the rings. It will be readily recognized that with this type of bearing the roller will have a tendency to turn to a position at right angles to its normal position, and for this reason cages must be employed for maintaining the rollers in their proper positions.

The object of this invention is to provide a roller bearing of the type referred to in which the rollers will be retained in their normal operative position without need of a roller cage.

In carrying my invention into effect I provide the roller bearing with rollers flattened on two opposite sides as already known consisting not in a section of an exact ball but in a section of an otherwise shaped solid of revolution such as an ellipsoid, so that the distance through the center of the roller and normal to the axis is less than any diagonal distance through the center of the roller. By this construction the rollers cannot be tilted or turned into or out of their ordinary operative position without the use of the necessary power to overcome the resistance exerted between the rollers and the race ways in the turning or tilting movement. It is essential that neither the rollers nor the race rings be damaged by this powerful tilting of the rollers in the moment of mounting or dismounting, and to secure this requirement, I make the difference between the above mentioned diagonal distance through the center of the roller and the free space within the race ways so slight, that the resistance set up when tilting the rollers into or out of their operative position, will be kept below the elastic limit of the material of the rollers and the bearing rings. From this construction, it will result that the deformation of the said parts in the tilting movement will be only momentary, and the said parts will resume their original and exact form immediately after the tilting movement has been completed.

Figure 2:
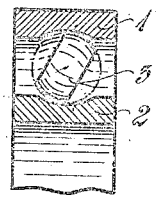
Figure 3:
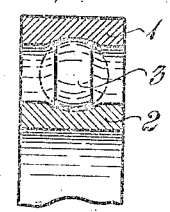
Figure 6:
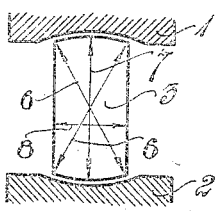
Figure 4:
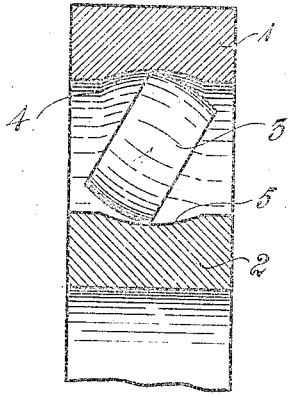
Figure 5:
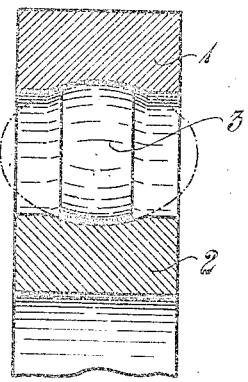

In the accompanying drawing Figures 1–3 illustrate the known manner in which the rollers are inserted into the bearing, while Figs. 4–6 in a somewhat larger scale demonstrate the corresponding method in connection with my improved shape of the rollers. In all the figures there are shown merely the upper portions of a single row roller bearing with the parts in transverse section. Fig. 1 shows the first stage when applying a roller of the known type into the bearing. Fig. 2 shows the next stage when the roller is tilted upright into its operative position. Fig. 3 shows the roller in operative position. The roller cage, referred to above as indispensable in connection with the known type of rollers is not shown in the drawing.

Fig. 4 illustrates the improved roller when tilted to or from its place in the bearing and when it has reached its most critical position. Fig. 5 shows the roller ready for operation, the ellipsoidal shape being indicated by dot and dash lines. Fig. 6 is a diagrammatic view on an exaggerated scale.

Though the invention is illustrated in the drawing as applied on a single row radial bearing, the same may be embodied in double or multiple row radial bearings and axial bearings, and I do not confine myself to the special embodiment of roller bearings exemplified in the drawing.

The same reference figures refer to similar parts in all of the figures of the drawing.

In the drawing the bearing rings are marked 1 and 2 respectively and their grooved race way 4 and 5. The rollers located within these race ways are designated 3, and they are flattened on two opposite sides as mentioned above. The roller 3 in Figs. 1-3 is a section of an exact ball (as indicated by dotted lines in Fig. 3) and the distance between its flattened sides or the axial width of the roller is less than the distance between the bearing rings so that the rollers may be inserted between the rings as shown in Fig. 1 and then tilted, as shown in Fig. 2, into the position shown in Fig. 3. This tilting movement can be performed without any resistance on account of the exact ball shape of the rollers 3.

The roller illustrated in Figs. 4-6 is a symmetrical section of an ellipsoid as indicated by the dot-and-dash lines in Fig. 5. In Fig. 6 the line 6 representing the diagonal distance through the center of the roller is of greater length than the line 7 which represents the distance through the center of the roller and normal to the axis. From Fig. 4 it will be noted that the length of the diagonal distance 6 does not allow the roller to be tilted freely into the operative position shown in Fig. 5, but a resistance is set up at the points of contact shown in Fig. 4. This resistance will result in an expansion of the width between the race rings, as indicated in Fig. 6 wherein the distance between the bottoms of the grooves of the race ways equals the length of each of the diagonal lines 6. According to the invention, however, this deformation is not permanent but only momentary, so that the rings 1 and 2 immediately after that the roller 3 has passed the critical position shown in Fig. 4, resume their original positions and engage the rollers 3. Accordingly it is to be understood, that the free spaces shown in Fig. 6 between the roller and the race ways are not found in reality and are drawn only to schematically demonstrate the operation. To fulfil this requirement of restoration of the original dimensions of the bearing rings, it is necessary, that the resistance exerted in the critical moment shown in Fig. 4 does not exceed the elastic limit of the material of the rollers and bearing rings. To obtain this effect the width 8 of the rollers between the flattened sides, that is the width of the ellipsoidal section is selected with the view of having the distance represented by the lines 6 approximately equal to the distance between the bottom of the grooves. It is evident, that the resistance exerted during the tilting movement will be sufficient to prevent the accidental tilting of the rollers and for this reason roller cages need not be employed. It may be desirable to use a slight cage for retaining the rollers in speed relation, so that they will not contact with each other causing wearing.

Having thus described my said invention, and how it is to be performed, what I claim and desire to protect by Letters Patent is:

1. In an antifriction bearing, the combination of two bearing rings spaced apart and having oppositely disposed grooves curved transversely, and a roller located between said rings and having flattened sides and a transversely curved periphery, the distance through the center of the roller and normal to the axis being less than any diagonal distance through the center of the roller and included within the curved periphery.

2. In an antifriction bearing, the combination with two bearing rings having grooved raceways curved transversely, of rollers located in the raceways, each of said rollers being a symmetrical section of an ellipsoid, the curves of the grooves being approximately the same as the curve of the roller periphery.

3. In an antifriction bearing, concentrically arranged inner and outer race ways, the inner race way having an external groove curved in cross section, the outer race way having an internal groove curved in cross section, said grooves being arranged opposite each other and their curves being parts of ellipsoid curves, and rollers located between said race ways and having curved peripheries and flattened sides, each of said rollers being a symmetrical section of an ellipsoid.

In testimony whereof I have affixed my signature in presence of two witnesses.

ERNST HJALMAR WALODDI WEIBULL.

Witnesses:
BJORN KISTNER,
AKE KERNELL.